No. 884,640. PATENTED APR. 14, 1908.
T. CARNEY.
CASH REGISTER.
APPLICATION FILED JULY 6, 1901.
10 SHEETS—SHEET 2.
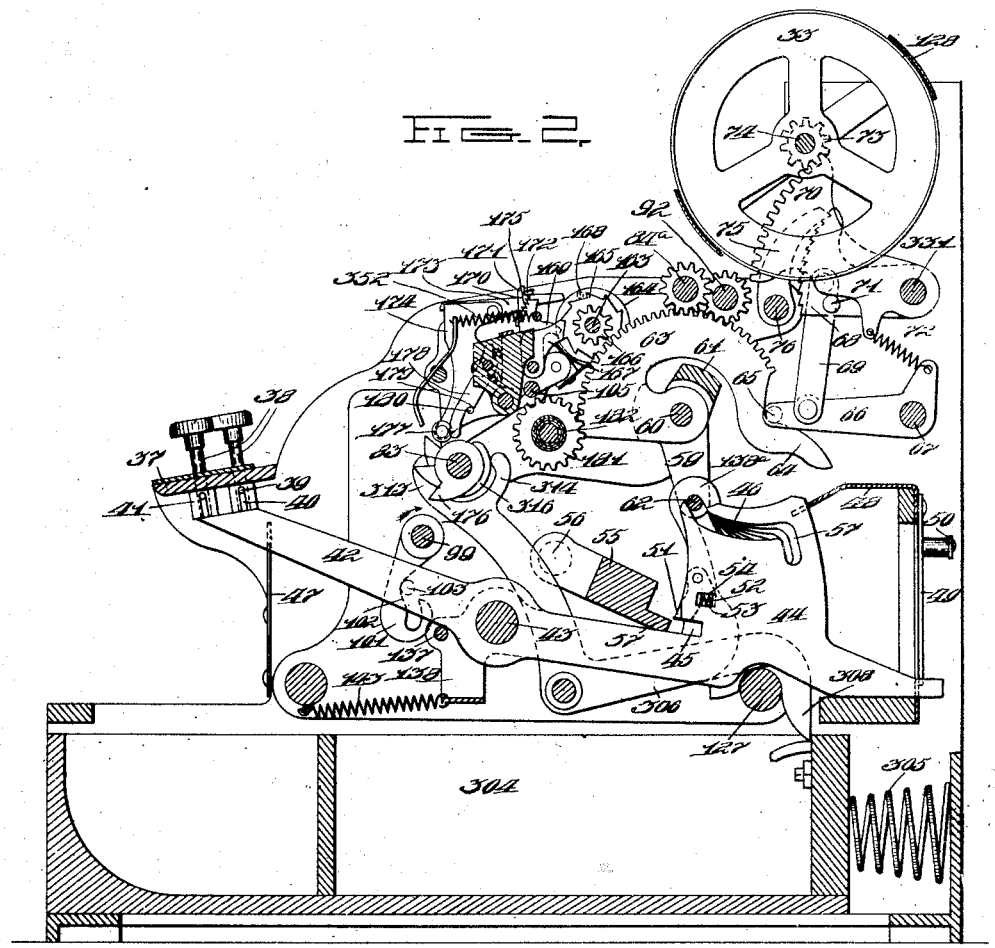

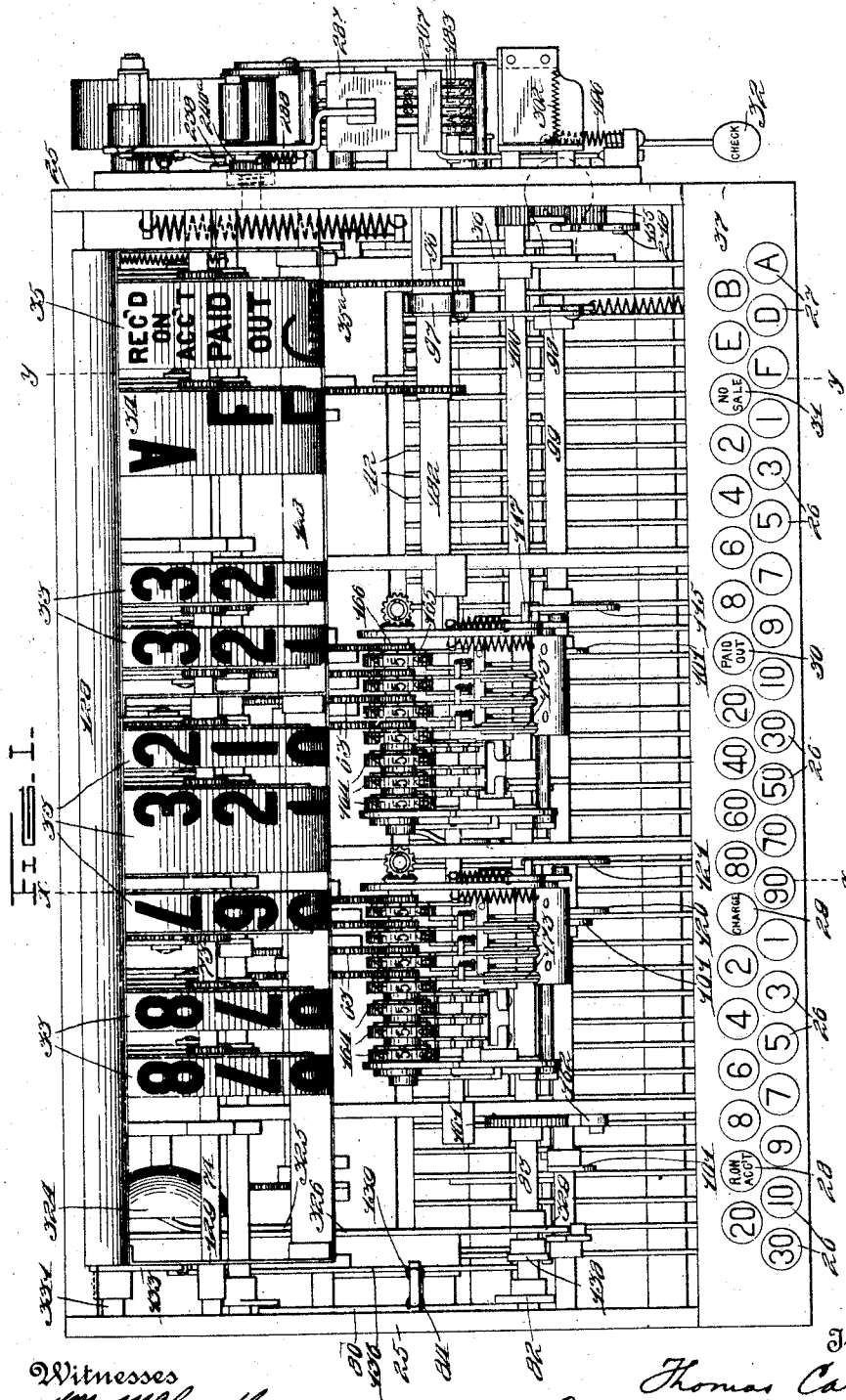

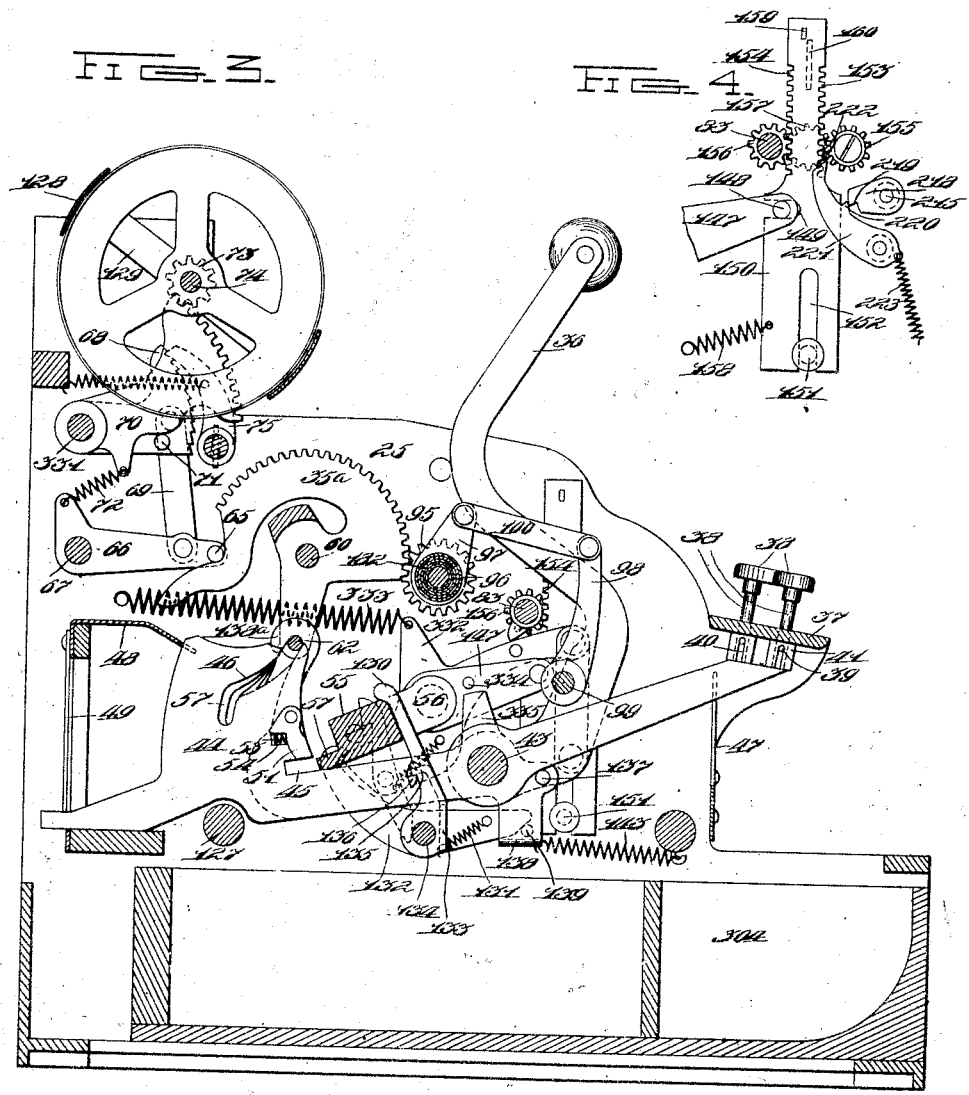

No. 884,640. PATENTED APR. 14, 1908.
T. CARNEY.
CASH REGISTER.
APPLICATION FILED JULY 6, 1901.
10 SHEETS—SHEET 4.
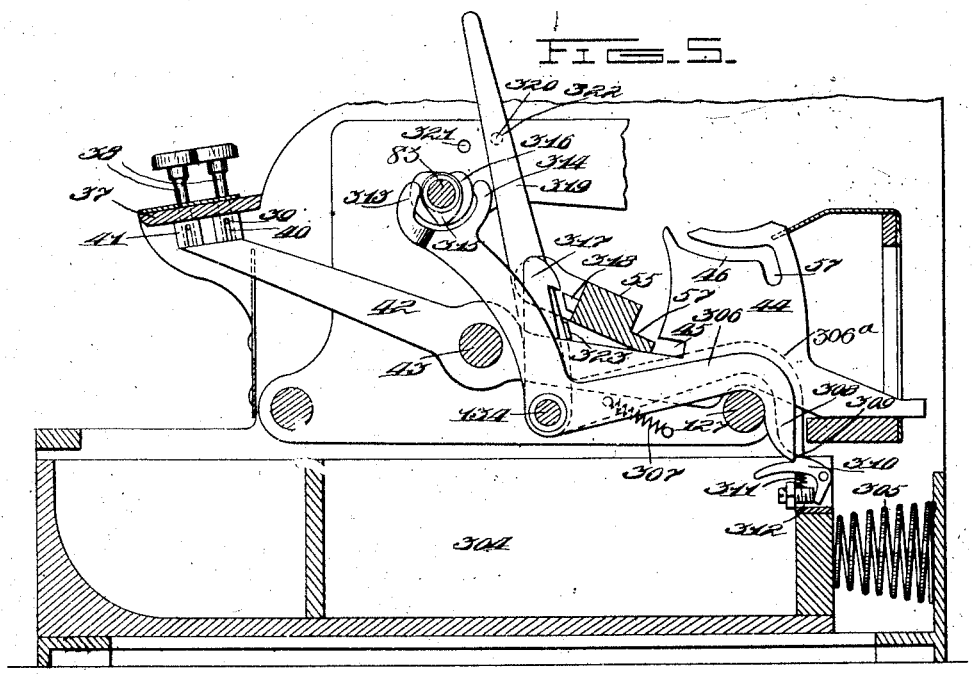
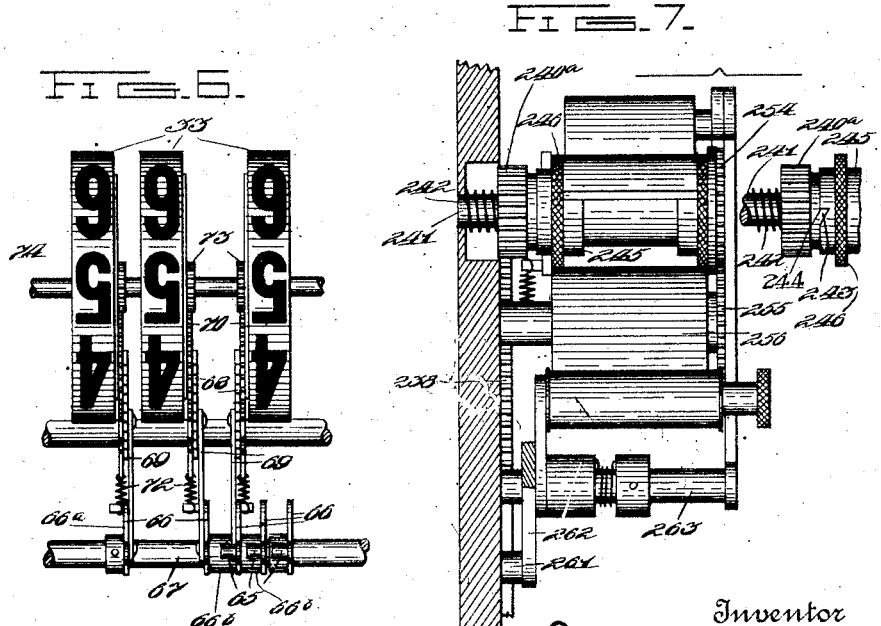
Witnesses
Wm. McCarthy
Inventor
Thomas Carney
By Alvan Macauley
Attorney No. 884,640. PATENTED APR. 14, 1908.
T. CARNEY.
CASH REGISTER.
APPLICATION FILED JULY 6, 1901.
10 SHEETS—SHEET 5.
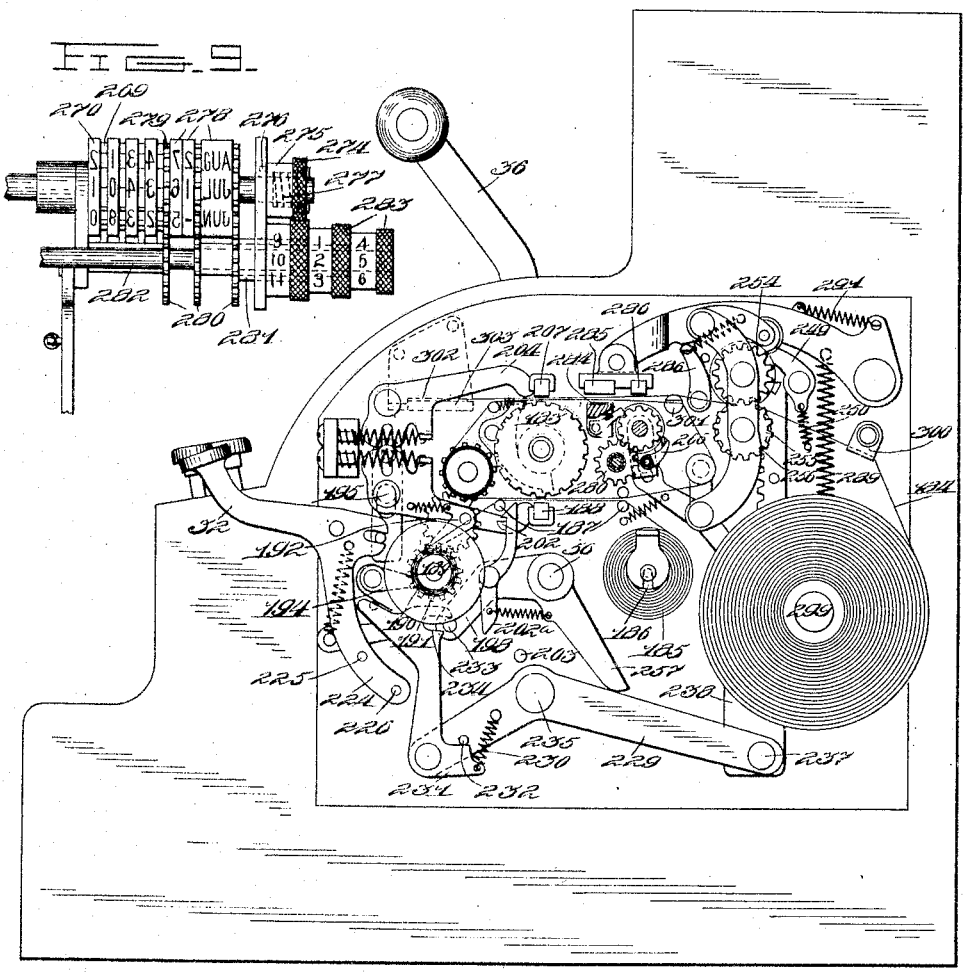

No. 884,640. PATENTED APR. 14, 1908.
T. CARNEY.
CASH REGISTER.
APPLICATION FILED JULY 6, 1901.
10 SHEETS—SHEET 6.
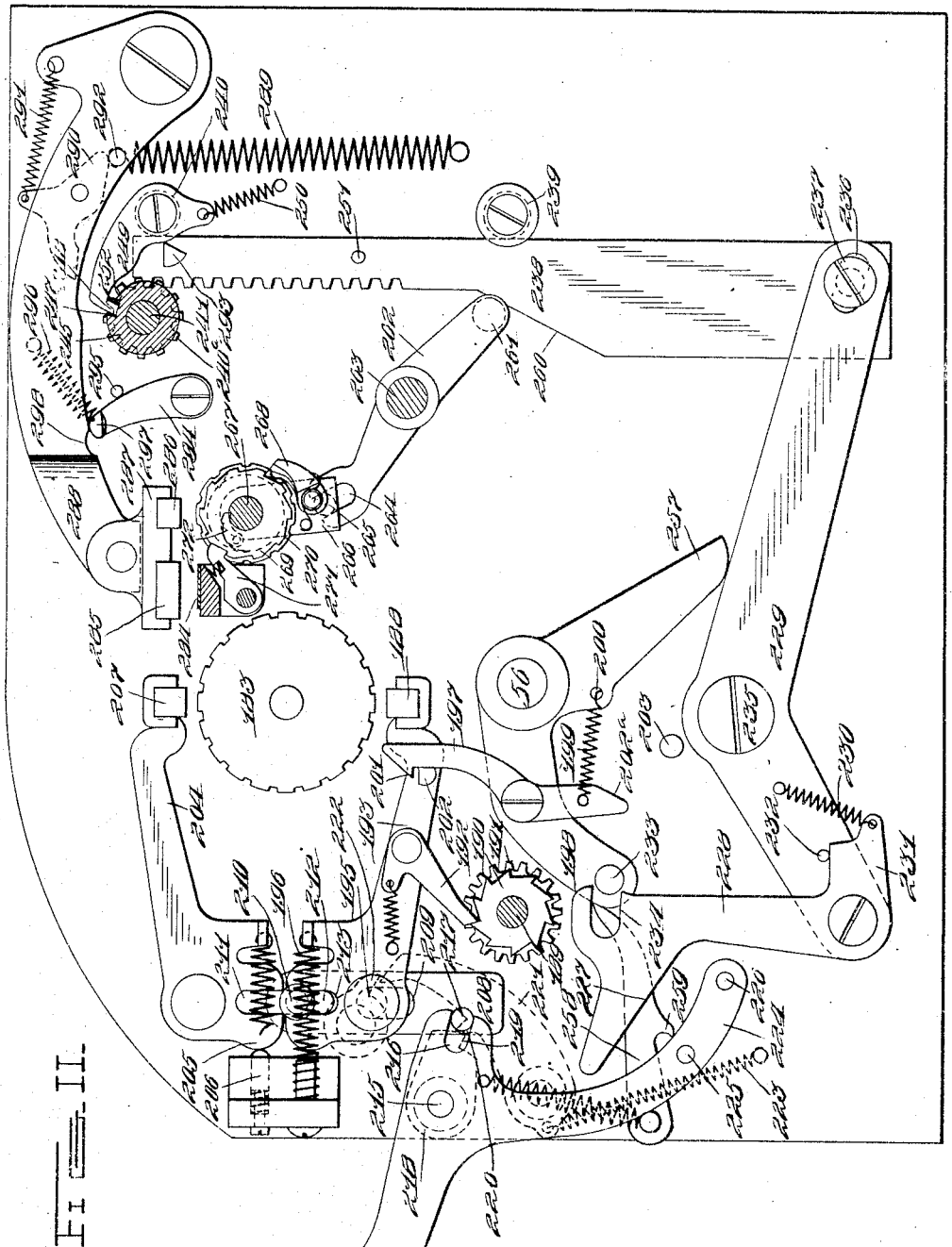
FIG. II.
Witnesses
Inventor
Thomas Carney
By Alvan Macauley
Attorney

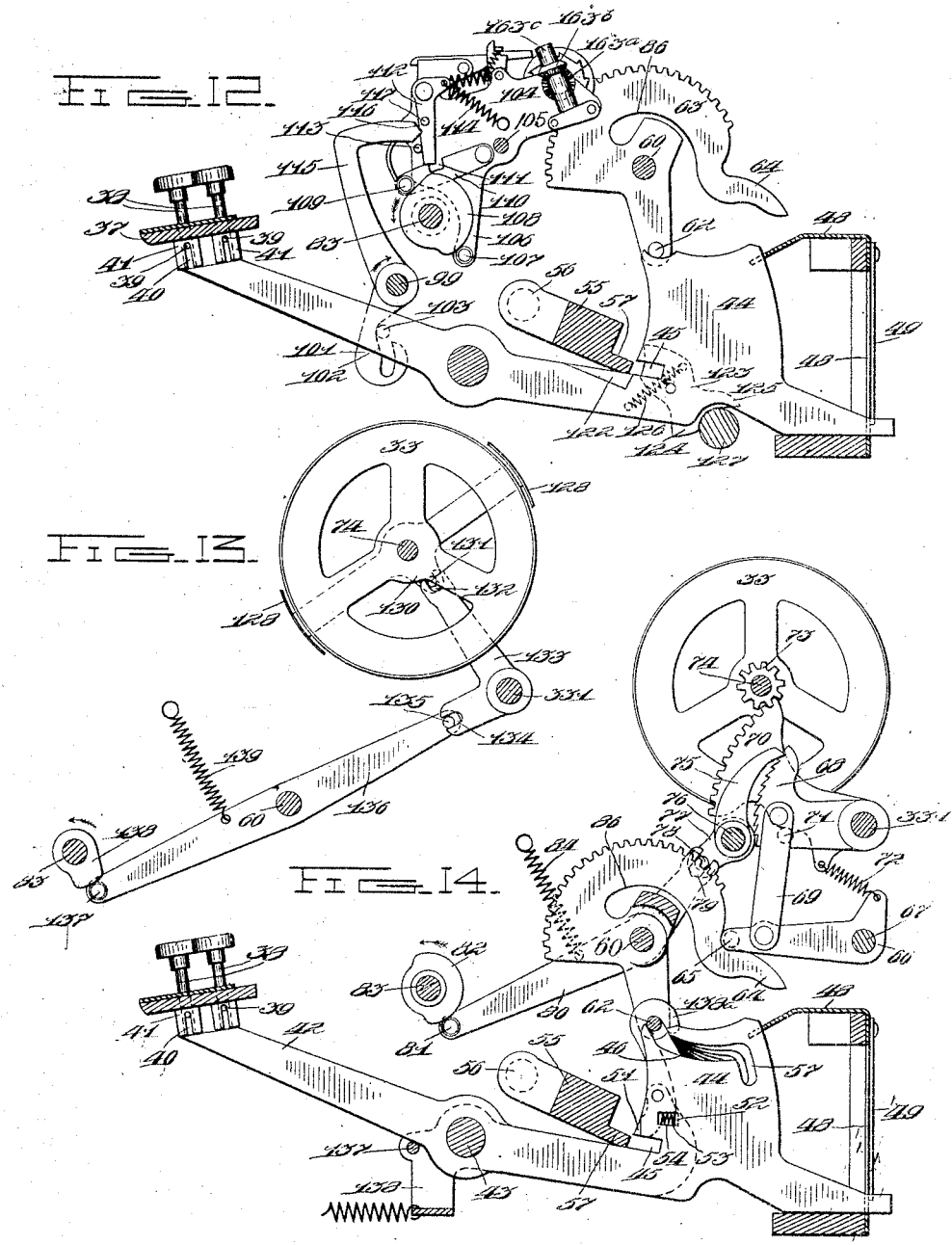

No. 884,640. PATENTED APR. 14, 1908.
T. CARNEY.
CASH REGISTER.
APPLICATION FILED JULY 6, 1901.
10 SHEETS—SHEET 8.
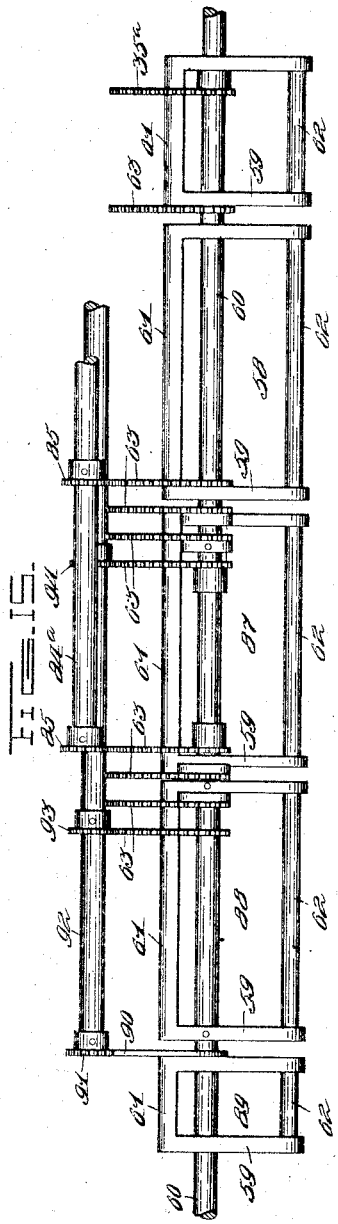
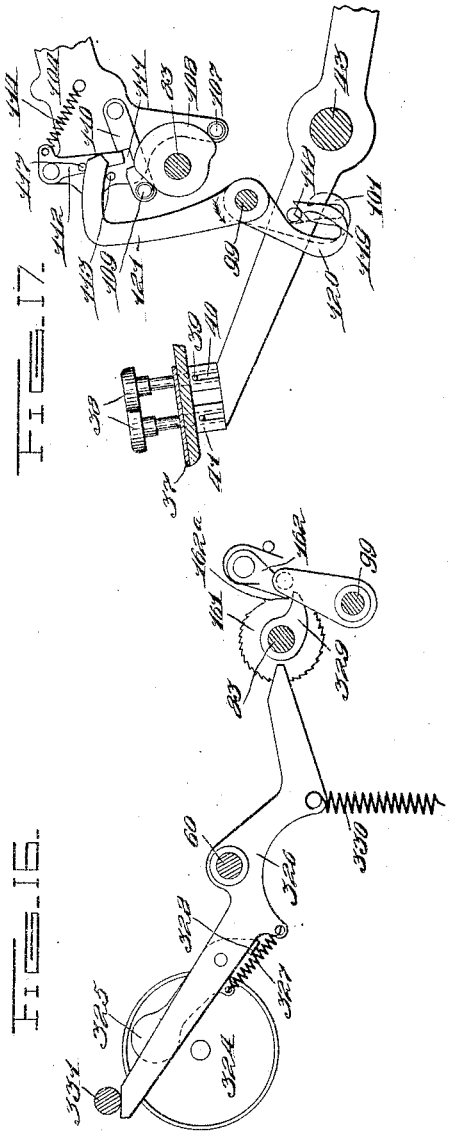
Witnesses
Inventor
Thomas Carney
By Alvan Macauley
Attorney

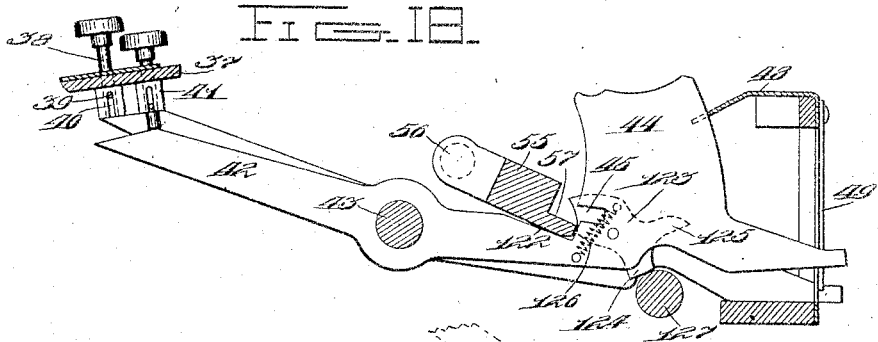

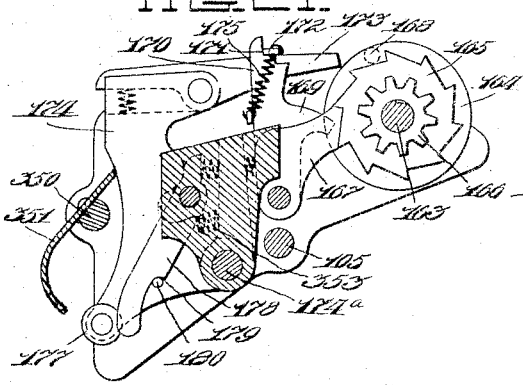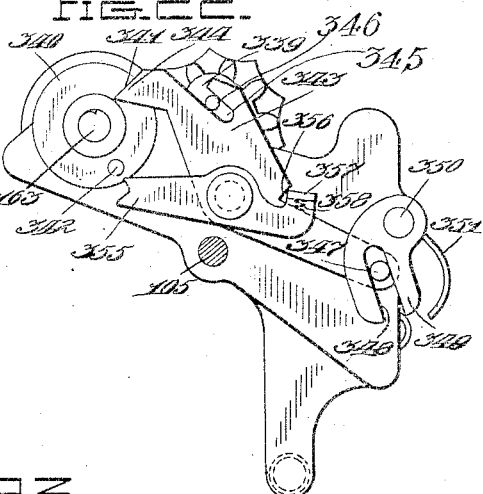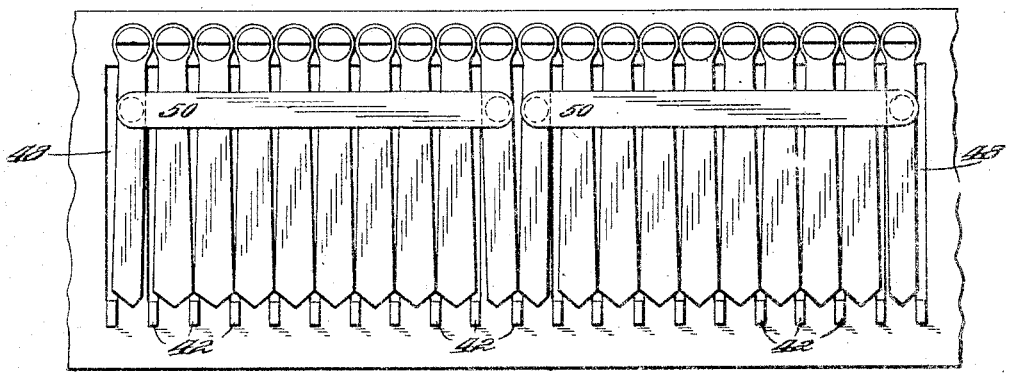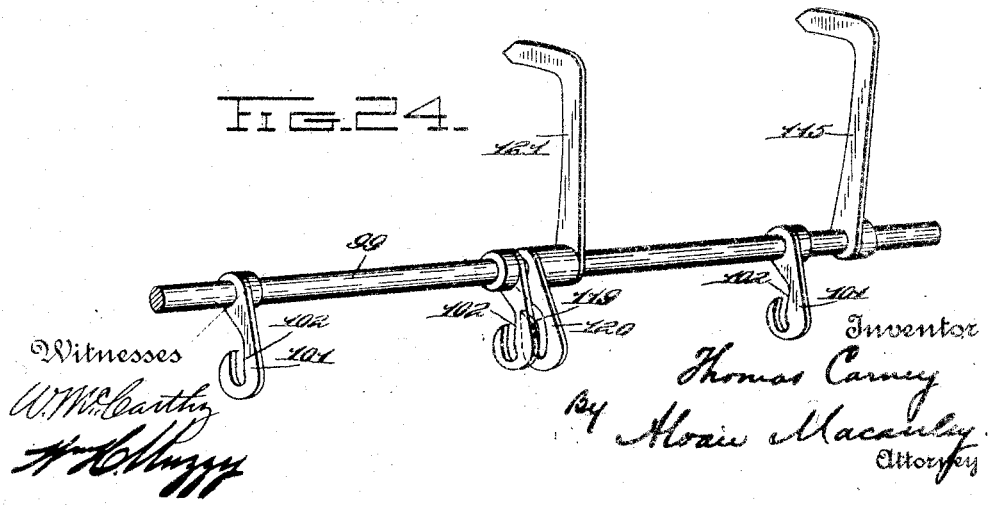

UNITED STATES PATENT OFFICE.

THOMAS CARNEY, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO. (INCORPORATED IN 1906.)

CASH-REGISTER.

No. 884,640.

Specification of Letters Patent.

Patented April 14, 1908.

Application filed July 6, 1901. Serial No. 67,366.

*To all whom it may concern:*

Be it known that I, THOMAS CARNEY, a citizen of the United States, residing at Dayton, in the county of Montgomery and State of Ohio, have invented certain new and useful Improvements in Cash-Registers, of which I declare the following to be a full, clear, and exact description.

This invention relates to improvements in cash registers, and has more particular relation to improvements in registers of the multiple counter type.

The invention consists of certain novel constructions, combinations and arrangements of parts, all of which will be hereinafter more particularly set forth and claimed.

In the accompanying drawings forming part of this specification; Figure 1 is a top plan view of the devices embodying my invention, the cabinet of the same being removed to expose the mechanism; Fig. 2 is a vertical transverse sectional view of said devices taken on the line $x-x$ of Fig. 1; Fig. 3 is a similar sectional view, looking in the opposite direction and taken on the line $y-y$ of Fig. 1; Fig. 4 is a detail side elevation of the rotation rack and coöperating pinions; Fig. 5 is a broken vertical sectional view showing the drawer latch and the drawer-operated key-locking devices; Fig. 6 is a detail front elevation of a number of amount indicators and their operating devices; Fig. 7 is a detail front elevation of the check-strip feeding devices, and a detached view of the clutch element; Fig. 8 is a side elevation of the printing mechanism with the inclosing hood for the same removed; Fig. 9 is a detail front elevation of the dating and consecutive number printing wheels and coöperating parts; Fig. 10 is a detail side elevation of one of the consecutive number printing wheels; Fig. 11 is an enlarged side elevation of the printer, a number of the parts being omitted for clearness; Fig. 12 is a detail side elevation of the "cash" counter and its coöperating parts and the special paid out key; Fig. 13 is a detail side elevation of the flash operating devices; Fig. 14 is a detail side elevation illustrating the transmission of graduated movements from the keys to the indicators; Fig. 15 is a detail top plan view showing the arrangement of the registering frames and operating rack segments; Fig. 16 is a detail side elevation of the alarm sounding devices; Fig. 17 is a detail side elevation, partly broken away, of the "charge" counter, its key and coacting parts; Fig. 18 is a detail side elevation of one of the special keys in the position it occupies after its initial movement; Fig. 19 is a similar view showing the position after the key-coupler has been completely raised; Fig. 20 represents a detail side elevation of the devices connecting the operating handle to the key-coupler; Fig. 21 is a detail transverse sectional view through the counter; Fig. 22 is a detail end elevation of the same; Fig. 23 is a broken detail rear elevation of the key hangers showing the connecting links for the special key hangers, and Fig. 24 is a detail perspective view of the rock shaft carrying the key operated cam arms and the counter adjusting arms.

In the aforesaid drawings the part 25 represents the frame of the machine; 26 the amount keys; 27 the clerk's keys; 28, 29 and 30 the special transaction keys; 31 the "no sale" key; 32 the check key; 33 the amount indicators; 34 the clerk's indicator; 35 the special transaction indicator, and 36 the operating lever or handle.

*General description.*—Generally described, this machine may be said to include a series of depressible keys comprising key levers and headed stems which latter when operated set said key-levers for operation by a movable member common to them all and operated by an independent handle. The key-levers are formed with cam slots the walls of which engage and operate registering frames through different degrees of movement. These frames carry rack segments which are arranged in duplicate series for the operation of independent counters which are thrown into engagement therewith as desired. The movements of the racks set the indicators, and leave them set when the racks return. The said racks also move the printing wheels therewith so that a record of the amount registered may be made. The clerk's keys, which unlock the operating handle, are locked until an amount key is operated. The printer issues a check only when a special check key is operated, and the check-key after being operated is automatically returned to its normal position by the operation of the machine.

Many of the devices connected with the present invention are improvements over the devices shown and described in my Patent No. 764,559, dated July 12, 1904.

Passing now to the description of the details and taking up the parts in their natural order, I will first describe the keys and key-levers and their coöperating connections.

*Keys and key-levers.*—The keys are all mounted in an incline key-board 37 fast to the frame, and are arranged as shown in Fig. 1, in five banks, four of which represent respectively units of cents, tens of cents, units of dollars and tens of dollars, and the additional bank represents the several clerks, or if desired, different departments. Each key comprises a numbered or lettered head and a stem 38, the latter passing down through suitable apertures in the key-board. The key-stems are prevented from turning in these apertures by pins 39 projecting laterally therefrom and into guiding slots 40 formed in sleeves 41 which surround said stems and are pendent from the key-board, (see Fig. 14 of the drawings).

By reference to Fig. 1 it will be seen that the keys are arranged in two horizontal rows with the keys of one row out of alinement with the keys of the other so that the lower end of each key-stem lies directly above the forward end of one of the key-levers 42. These key-levers are journaled upon a transverse shaft 43 which is mounted in the main frame, and each of the same is formed with a vertical standard 44 having a coupling-notch 45 and a cam-slot 46.

As shown in Fig. 2, each of the key-levers is guided at its forward end by a slotted guide-plate 47 secured to the frame and at its rear end by a slotted and notched plate 48; the rear end of the lever projecting through one of the slots of this plate while the standard 44 projects through one of its notches. The rear ends of the keys coöperate with pivoted wedge-ended hangers or stops 49 for preventing the operation of more than one key-lever in a single bank at one time, in a manner well known in the art. The hangers of the special key-levers 28, 29 and 30 are coupled by link-bars 50 so that only one of said keys can be operated at the same time (see Fig. 23). Each of the key-standards, excepting those of the special keys 28, 29 and 30, is provided with a pivoted lifting pawl 51, so mounted thereon as to be normally projected into the path of the key-coupler when the key is displaced from normal position. Each of these pawls is yieldingly held in its normal position by a coil spring 53, which engages at one end with a lug 52 stamped from its respective key, and at the other with its respective pawl as best illustrated in Fig. 14. The pivoted key-coupler 55 is of a construction well known in the art and is mounted in the main frame by end trunnions 56, which are journaled in suitable apertures formed in the frame. This key-coupler, as shown in Fig. 14, is formed at its rear with a projecting flange 57 which when the key-levers 42 are operated passes into the notches 45 and thus couples all the keys together in a manner well known in the art. When an amount key is operated, and its key-lever given its initial movement, the key-coupler is correspondingly raised to its coupling position so that any subsequent operation of another key-lever will cause the pawl 51, carried thereby, to be forced rearward and ultimately snap over the top of the coupler flange, and thus couple the second key lever for movement with the coupler. After the key-coupler has made its initial movement as above described, it is prevented from moving backward by a ratchet and pawl full stroke mechanism connected thereto and hereinafter more fully described. The formation of each of the before-mentioned cam-slots 46 of the key lever standards includes a cam portion proper for effecting the movement of the registering frame bar and a free play portion 57 for allowing an additional independent movement of the key-lever but preventing any overthrow of the registering frame bar.

Each of the registering frames 58, 87, 88 and 89 comprises two arms 59 all of which excepting the arms of frame 88 are pivoted upon a transverse shaft 60 and connected by bars 61 and 62, as best shown in Fig. 15. The arms of frame 88 are fast to the shaft. The bar, or rod 62, of each frame normally lies directly above all the upper open ends of the cam-slots 46, of the key levers of that particular frame so that when one of the amount-key-levers is operated, the walls of its cam-slot will engage said bar and rock the same. As the cam-slots are graduated, each bar 62 is rocked different distances by its several keys and the desired graduated movements of the registering frames thus secured.

*Amount indicators.*—As the construction and operation of the amount indicators are similar in each instance, I will describe one only as this will suffice for all. The registering frame 58 for the units of cents bank, as above stated, is journaled upon the shaft 60 and is provided with a segmental rack 63 having a rearwardly extending cam-arm 64 for operating its respective indicator. As the registering frame 58 is moved different distances according to the value of the key-lever operated, the cam-arm 64 will be correspondingly raised and by its engagement with a pin 65 mounted on a pivoted bell-crank lever 66 which is journaled upon a transverse rigid shaft 67, will rock said arm to secure a graduated movement. This arm is connected to a pivoted ratchet-segment 68 mounted on a shaft 331 by a link-bar 69. The ratchet-segment 68 will thus receive a graduated movement corresponding to the movement of the registering frame, and in turn will transmit this movement to a pivoted rack segment 70 also mounted on shaft 331 through the medium of a pin 71 carried by the ratchet segment and which engages the underside of the rack segment as clearly shown in Fig. 2. The rack segment 70 is connected to the bell-crank lever 66 by a coil spring 72 and meshes with a pinion 73 fast to its respective indicator which is journaled upon a transverse rigid shaft 74.

It will be seen by reference to the above description and Fig. 14 of the drawings that the stress of the spring 72 will be increased according to the degree of movement of the bell crank 66 and the rack segment 70 and that the ratio of increase will be compounded as the spring is distended from both ends so that the natural tendency of the parts to overthrow under a rapid movement will be counteracted, to a greater or less degree, according to the duration and rapidity of movement. This construction is all-important in a mechanism of this character, in which the connection between the prime mover and the indicator actuating mechanism is broken and in which said mechanism has no means other than its returning spring for preventing its overthrow.

It will further be observed that the indicator and its rack-segment 70 may move forward or overthrow independently of the ratchet segment 68 without in any wise affecting the accuracy of the indication, as the spring 72 must ultimately draw the indicator back to the proper position with the lower edge of the rack segment resting against the pin 71. The possibility of overthrow of the ratchet segment 68, which is the controlling part, is thus reduced to a minimum, if not absolutely overcome. After said ratchet segment has been adjusted to the proper position according to the movement of its respective registering frame, it is locked in this position by a pawl 75, said pawl being one of a series mounted upon a transverse rock shaft 76 suitably mounted in the main frame and provided at one end with an operating arm 77 carrying a pin 78. This pin projects into a notch 79 formed in the upper end of the bell crank lever 80 which is pivoted on the shaft 60 near one end, and is provided at its forward end with an anti-friction-roller 81. This roller is drawn into contact with the periphery of a cam 82 mounted on the rotation shaft 83 by a coil spring 84, which connects said bell crank to the main frame, as shown in Fig. 14. The tendency of the spring 84 is to rock all of the pawls 75 out of mesh with their respective ratchet segments when the bell crank lever 80 is permitted to move by the rotation of the cam 82. The cam 82 holds the pawls 75 in locking position during a part of the operation, then releases them, and finally throws them into locking position again as shown in Fig. 14. As the present machine is designed to indicate at both the back and the front of the machine, it becomes necessary to provide for actuating the duplicate set of indicators, and to accomplish this result and to also provide for the operation of the duplicate counters hereinafter described, I provide two sets of the rack segments 63. These segments for the units of cents bank are geared together, as best shown in Fig. 15, by a short rotary shaft 84ª, suitably journaled in the main frame and provided at its opposite ends with pinions 85 which mesh with the respective rack segments. As before stated, one of these rack segments is fast to the units of cents registering frame, and the other is loosely journaled upon the shaft 60 and is formed as shown in Fig. 14 with a curved slot 86, through which the tens of cents registering frame 87 projects. This frame 87 is mounted on the shaft 60, beside the frame 58, and has its rack segment 63 so mounted thereon as to lie next to the corresponding segment of the units of cents frame. The opposite end of the frame 87 is provided with a similar segmental rack 63 which represents the tens of cents in the second group of rack segments.

The registering frame 88 for the units of dollars is fast upon the shaft 60, and said shaft is provided with two rack segments 63 so positioned thereon as to occupy their proper relative positions in the respective groups of segments. Each of these last mentioned rack segments is formed with one of the curved slots 86 for the accommodation of the respective registering frames that must necessarily pass through the same. The tens of dollars registering frame 89 is journaled upon the shaft 60 and is provided with a rack segment 90 which is similar to the corresponding segments 63, excepting that it is not so long and the cam-arm 64 is omitted. This rack segment meshes with a pinion 91, which is mounted upon a transverse shaft 92 suitably journaled in the main frame and carrying two similar pinions 93 and 94 which mesh respectively with the tens of dollars racks 63 which are arranged in their proper positions in the rack groups, and are journaled upon the shaft 60 and formed with the aforesaid curved slots for the accommodation of the registering frames.

As the arms 64 of the rack segments of the units and tens of cents in the left hand group do not occupy the correct position to coöperate with their respective indicators in the left hand group the bell-crank lever 66 of the units of cents rack is fast to the left-hand part of the shaft 67; the latter being divided to allow its left hand end to rotate free of its right hand end, (see Fig. 6). A similar arm 66ª is also secured to said shaft and is connected to its respective indicator in a manner similar to the other indicators. A sleeve 66^b is journaled on said shaft 67 and carries two of the levers 66 one of which coöperates with its arm 64 and the other with the indicator connections substantially as just described in connection with the units of cents bank. The lever 66 for the units of dollar is journaled on the sleeve 66^b as shown in Fig. 6. Two indicators are provided for each bank excepting the tens of dollars bank for which I provide a single indicator having a double row of figures for indicating back and front in a manner well known in the art. It will be seen from the above that the coupled groups of rack segments and indicators move in unison, and that either one or the other of the totalizing counters is operated by its respective group of segments if it is properly adjusted for engagement therewith.

The above description relates specifically to the amount indicators, and the mode of operation for the clerk's or department indicator is substantially the same, with the exception that in this case a single indicator 34 provided with two parallel rows of characters is utilized to indicate at both the back and front of the machine. The special double indicators 35 for indicating the character of the transaction, whether it be "cash", "paid out", "received on account" or "charged", is also operated in substantially the same manner as the indicators already described, with the exception that its operating rack segment 35^a does not receive movement from a registering frame but is operated by a pinion 95 which is fast upon a short sleeve 96 journaled upon the outermost of a series of nested printer sleeves which will be hereinafter more particularly described. This sleeve 96 is provided with a crank arm 97 (see Figs. 1 and 3) which is connected to another similar arm 98 mounted upon a rock shaft 99 by a pivoted link 100. The shaft 99 is provided with a series of graduated pendent hook arms 101, formed with cam-surfaces 102 as shown in Figs. 17 and 24. These arms are arranged to be operated by pins 103 mounted upon the respective key levers of the special keys so that when one of said key-levers is operated, it will rock the said shaft 99 to a greater or less degree and thus secure the desired graduated movement for properly setting the special indicator. In order to prevent the possible overthrow of one of the arms 101 by a partial operation of one of the key-levers, the hook ends of said arms are so constructed as to become locked to the pins 103 after the movements of the key-levers have commenced.

As each of the special keys 28, 29 and 30, when operated, rocks the shaft 99, this movement is utilized to throw out the cash counter which is shown in Fig. 12 and which is normally in position to receive the registrations. This counter is mounted in a counter-frame 104, pivoted upon a shaft 105 which is mounted in the main frame and is provided with a pendent arm 106 carrying an anti-friction roller 107, engaging the periphery of a throwing cam 108 mounted upon the aforesaid rotation shaft 83. The office of this arm 106 and cam 108 is to throw the counter back with its pinions out of mesh with the rack segments during the return of said segments, after a registration has been made. The counter is thrown forward to bring its pinions into mesh with the rack segments by the aforesaid cam 108 which engages an anti-friction roller 109 mounted upon an arm 110, which is pivoted upon the counter frame and is formed with a notch 111 in its upper edge. A pivoted bell crank pawl 112 is also mounted upon the counter frame, and is normally drawn into contact with a stop-pin 113 on said frame, by a coil spring 114 which connects said pawl to the frame. This position of the bell crank pawl is shown in Fig. 12, and will be hereinafter termed the "operating position" of the counter. When the shaft 99 is rocked as aforesaid, an angular arm 115 rigid on said shaft is thrown rearward to bring its bevel end 116 into contact with a pin 117 mounted upon the bell-crank pawl, to force the vertical portion of the pawl 112 rearward until its lower end is in alinement with the notch 111. When the pawl is in this position the counter is inoperative, as the pivoted arm 110 is free to be elevated without rocking the counter frame. When the pawl 112 is allowed to resume its normal position, as shown in Fig. 12, its lower end will pass from over the notch 111 and into a position to be engaged by the arm 110 when the same is raised. This construction, in effect, locks the arm 110 to the counter frame, or unlocks the same, as the case may be. The remaining, or charge counter, shown in Fig. 17, is normally adjusted to the position shown in this figure, in which it is inoperative. When the charge key-lever is operated, a pin 118 mounted thereon engages the bevel end 119 of a hook arm 120, which is loose upon the rock shaft 99, and rocks said frame, to disengage an arm 121, carried thereby, and similar to the arm 115, from the pawl 112 of this particular counter. The charge counter is thus thrown into operative position and the cash counter simultaneously adjusted to its inoperative position by the single operation of the charge key. By means of the above described devices, the cash counter will be thrown out upon the operation of any one of the special keys, and in addition the charge counter will be thrown into operative position upon the operation of the charge keys alone.

As it is desirable in this particular type of machine to compel the operation of the amount keys before the clerk's keys and prevent the unlocking of the clerk's keys by the operation of a special key, each of said special keys is arranged to be given its initial movement without operating the key coupler. This is accomplished by forming each of the special key levers with a notch 122, which, when the lever is operated, accommodates the flange of the key coupler without moving the latter, as best shown in Figs. 12, 18 and 19. After a special key lever has been operated, it assumes the position shown in Fig. 18 and is held in this position by a pivoted pawl 123 mounted thereon and provided with a support lug 124 and a tripping nose 125. The pawl is connected to its respective key-levers by a coil spring 126, so that when the lever is raised into the position shown in Fig. 18, the lug 124 will spring rearward over the top of the transverse shaft 127 so as to support the key-lever in this position when the pressure upon its forward end is withdrawn. The pawl 123 when in this position projects over the notch 45 of its respective standard so that when the key-coupler is subsequently raised and passes into said notch, it rocks the pawl upon its pivot until the spring 126 is shifted to exert its force in a line below the fulcrum of the pawl, as shown in Fig. 19. This operation adjusts the pawl to a position which it retains upon the return of the key coupler until the nose 125 strikes the shaft 127, when the spring is again shifted to exert its force above the pawl fulcrum, as shown in Fig. 12.

As it is desirable in all machines belonging to the class of the present invention, to conceal the indicators while the same are moving or being set, I have provided two flash-plates 128, located upon opposite sides of the indicators, and connected at their ends by arms 129, which are pivoted upon the indicator shaft. One of these arms is provided, as shown in Fig. 13, with an operating extension 130 which carries a pin 131. This pin projects into a slot 132 formed in the upper end of a pivoted bell crank lever 133. The lower end of said lever is also formed with a slot 134, into which projects a pin 135 mounted upon a pivoted lever 136. This latter lever is provided at its forward end with an anti-friction-roller 137, which is normally drawn into engagement with the periphery of a cam 138 mounted upon the rotation shaft 83 by a coil spring 139 which connects said lever to the main frame.

When the parts are in the normal positions shown in Fig. 13, the flash plates 128 are moved away from the indicating apertures of the cabinet and the indication is thus exposed. When the rotation shaft 83 is moved from its normal position, as shown in this figure, the cam 138 releases the lever 136 and thus permits the spring 139 to draw the flash plates over the reading apertures. As the rotation of the shaft is completed, the cam 138 again moves the lever 136 into the position shown in Fig. 13 and thus discloses the indication. As has before been stated, the clerk's keys are locked until an amount key has been operated, and the operating handle is locked until a clerk's key has been operated. The detail constructions and operations of these locks are as follows:

*Key controlled locks.*—When the key-coupler 55 is given its initial movement by the operation of one of the amount keys, as before described, it contacts with and operates a cam-arm 130, which normally rests against the forward curved surface of the same, as shown in Fig. 3, said arm being held in this engagement by coil spring 131, which connects it to a pivoted latch lever 132, the purpose of which will be presently described. The lever 130 forms part of a yoke frame 133, pivoted upon a transverse shaft 134 and formed with a series of fingers similar to the lever 130, with the exception that the upper part is omitted. Each of these fingers, as well as the lever 130, is provided with a bevel nose 135, which is so located as to coact with a bevel lug 136 mounted on its respective clerk's key lever. All of the noses 135 normally project over the lugs 136, as shown in Fig. 3, but when the lever 130 is operated as above described, the frame 133 is rocked against the tension of its spring 131, the noses all move from over the lugs and permit the operation of any one of the clerk's key levers. When one of said clerk's key levers is given its initial movement, it depresses a transverse bar 137 which projects under all of said clerk's key levers and forms part of a yoke-shaped rocking-frame 138, which is journaled upon the key-shaft 43. This frame is provided at one end with a laterally projecting pin 139 which, when the frame is rocked as aforesaid, contacts with the bevel end of the aforesaid lever 132 and operates the same against the tension of the spring 131, to move the hook end 140 of said lever out of contact with a lever 141 which is pivotally mounted upon one of the trunnion ends 56 of the key coupler, as best shown in Fig. 20. As the lever 141 is connected by a pivoted link 142 to the operating handle 36, which is pivoted upon the shaft 43, the unlatching of said lever will unlatch the operating handle and permit the machine to be operated.

Each of the banks of keys is provided with one of the yoke frames 138, all of said frames being similar except that the pin 139 is omitted. Each of said frames is connected to the main frame by a coil spring 143, whereby the key-levers are assisted in their return movement. Each of the frames 138 is further provided with a rigid rearwardly and upwardly projecting hook-arm 138ª, each arm normally projecting over the bar 62 of its respective registering frame to return the latter to its normal position after it has been operated and upon the return stroke of the keys. The lever 141, when rocked upon its pivot by the operating lever contacts with a pin 144 mounted upon the end of the key coupler and thus raises the coupler to its uppermost position. In order to provide for the positive return of the key-coupler with the lever 141, I have mounted a pivoted spring-drawn-latch 145 upon said lever, 141, so that its lower bevel-end 146 normally contacts with the shaft 134 and holds the upper hook end of said latch out of the path of the pin 144 to permit the coupler to make its initial movement upon the operation of an amount-key. When the lever 141 is operated, however, the lower bevel end of the latch is moved away from the shaft 134 and the upper hook end of said latch thus permitted to pass over the pin 144 and couple the key-coupler and lever together during their entire stroke. Upon the final return movement of the lever 141, the bevel end of the latch again contacts with the shaft 134 and disengages the latch from the pin 144, to leave the parts in the position shown in Fig. 20. The reciprocating movement of the key coupler are utilized to secure a rotary movement of the main operating shaft 83, as follows:—

*Rotation shaft connections.*—Projecting forwardly from the key-coupler, as shown in Figs. 3 and 4, is a rigid arm 147, provided at its forward end with a pin 148 which projects into an elongated slot 149 formed in a rack-bar 150, as more clearly shown in Fig. 4. The bar 150 is mounted upon the main frame by means of a guiding bolt 151 which projects through an elongated slot 152 formed in said bar. The upper portion of said bar is provided upon opposite edges with rack teeth 153 and 154 which engage respectively with pinions 155 and 156. The pinions 155 and 156 are of sufficient width to engage both the racks 153 and 154 and also an intermediate pinion 157, journaled upon the main frame back of the rack-bar and meshing with both of the pinions 155 and 156. The width of the upper portion of the bar is such that the rack-teeth can only engage one of the pinions 155 and 156 at a time, the bar being oscillated to engage one of the same upon its upstroke and the other upon its down stroke. This oscillation of the bar is accomplished by a coil spring 158 which connects said bar to the main frame and is so located as to exert its power either above or below the bolt 151 when the bar is reciprocated, the bolt acting as a fulcrum. When the stress of the spring is from a point below the bolt 151, the rack is moved into engagement with the pinion 155, but when the power of the spring is exerted above the bolt, the rack is drawn into engagement with the pinions 156 as shown in Fig. 4. As the pinion 155 is mounted upon the main frame and the pinion 156 upon the shaft 83 and the intermediate pinion connects said first mentioned pinions, the reciprocation of the rack bar will result in a continuous forward movement of the pinion 156. In order to hold the rack bar to mesh with the proper pinion during an entire stroke, it is provided at its upper end with a lug 159 which operates on one or the other side of a flange 160 fast to the frame in a manner well known in the art. Any retrograde movement of the shaft 83 is prevented by a ratchet wheel 161 fast thereon, as shown in Fig. 16, and engaged by a suitable spring-pressed pawl 162. The ratchet wheel 161 has a number of teeth omitted in proximity to the normal engaging position of the pawl 162 so that when the coupler receives its initial movement it will be arrested by a single tooth 162ª. If the coupler is slightly overthrown it will settle back as the ratchet will move back until the tooth 162ª strikes the pawl 162.

It has heretofore been stated that the rack segments 63 are arranged in two corresponding groups or series, and that the two counters coöperate with these groups, and I will now describe the detail construction of the counters as follows:—

*The counters.*—As the two counters are substantially alike, a description of one will suffice for both. As has before been stated, each of the counters comprises a suitable rock frame 104 journaled upon a transverse shaft 105. Each of these frames carries at its rear end a transverse rotary shaft 163, upon which the counter wheels 164 are mounted. Each of the first four of these counter-wheels is provided with a ratchet wheel 165 and a pinion 166, the latter being adapted to be brought into mesh with its respective rack segment when the counter frames rock rearward in the manner before described. The counter wheels are numbered respectively from 0 to 9 and so located that the amounts indicated thereon may be read through suitable openings in the cabinet or casing, not shown. Any retrograde movement of these counter wheels is prevented by a series of spring-pressed-pawls 167 mounted in the counter-frame and engaging the ratchet wheels.

When one of the above mentioned counter-wheels has made a complete revolution, a pin 168 carried thereby engages a nose 169 upon a tripping pawl 170, which is mounted in the counter frame, and forces said pawl back against the tension of its spring to disengage a shoulder 171 formed thereon from a lug 172 of a spring pressed transfer pawl 173 which is mounted in the upper end of a pivoted lever 174, said lever being in turn pivotally mounted in the counter frame at 174ª. The pawl 170 and the pawl 173 are connected by a coil spring 175 so that when the tripping pawl is operated, the transfer pawl will drop into position to engage with the ratchet of its respective counter wheel when the lever 174 is operated. The said levers 174 are operated consecutively by means of a series of cams 176 mounted upon the rotation shaft 83 in progressive order (see Fig. 2) and so located as to contact with anti-friction rollers 177 journaled on the lower ends of said levers. In order to prevent any accidental movement of the levers 174, I provide each of the same with a latch lever 178, which is pivoted upon the counter frame, and is spring-pressed to normally force a shoulder 179 formed thereon over a pin 180, mounted on said lever 174. When the rotation shaft is operated, one of the cams 176 will first strike the lever 178 and operate the same sufficiently to disengage the shoulder 179 from the pin 180 before engaging the anti-friction roller 177 to operate the lever 174. This construction prevents any accidental or malicious operation of the levers 174 by means other than the regular operating cams.

The transfers between the higher wheels of the counter are effected by intermeshing pinions and scalloped wheels mounted in a rock frame 339 so that they may be moved into and out of engagement with the counter wheels, when the latter are to be turned to zero, all of which is old and well known in the art and needs no further description here.

The shaft 163 is provided at one end with a bevel pinion 163ᵃ which is engaged by a similar pinion 163ᵇ fast to a rotatable stud 163ᶜ mounted in the counter frame and which is adapted to be rotated by any suitable key. When the shaft is rotated by applying a key to the stud 163ᶜ it picks up the counter wheels and returns them to zero by the usual pivoted pawl arrangement which is old and well known to the art. The opposite end of the shaft 163 is provided with a cam disk 340 fast thereto and having a notch 341 and a pin 342. A pivoted lever 343 is mounted upon the counter frame and is formed at its rear end with a bevel nose 344 which projects into the notch 341. The lever is formed with a cam slot 345 into which a pin 346 mounted on the rock frame 339, projects whereby when the lever is operated by the cam disk the frame is thrown back to disengage the transfer wheels from the counter pinions. The lever 343 also carries a pin 347 which projects into an elongated slot 348 of an arm 349 which is fast to one end of a transverse rock shaft 350. This shaft carries a curved guard and stop plate 351 which is normally drawn forward at its upper end by a coil spring 352 which connects it to the counter frame as shown in Fig. 2. The upper edge of the plate 351 forms a stop for the transfer levers 174 which are forced back against the same by coil springs 353 mounted in the counter frame and bearing against the rear edges of said levers as shown in Fig. 21. When the parts are in their normal positions shown in this last mentioned figure, the noses of the trip pawls 170 lie in the paths of the pins 168 but when the shaft 350 is rocked by the operation of turning to zero the transfer levers 174 are allowed to spring forward and thus draw the tripping pawls out of the paths of the pins 168. The lower edge of the plate 351 makes the movement of the levers 174 positive by connecting therewith if the springs fail to act. The shaft 163 is arrested when the zero position is reached by a pivoted notched pawl 355 which is moved into the path of the pin 342 by a shoulder 356 formed on the lever 343 and which engages a transverse lug 357 formed on the pawl. A coil spring 358 is interposed between the lug and lever to return the parts to their normal positions shown in Fig. 22.

*The printer.*—The rack segments 63 of the amount banks, as well as the segments representing the clerk's bank and the special transactions, mesh with pinions 181 mounted on a series of nested sleeves 182, as shown in Figs. 2 and 3. These sleeves project laterally through the side frame of the register and are provided respectively with type wheels 183, as more clearly shown in Figs. 1, 8 and 11. These wheels carry numerals or characters corresponding to the banks which they represent, so that the amount of the transaction can be printed as well as the designating character of the clerk making the sale and the special character of the transaction. These printing wheels 183, as shown in Fig. 11, are provided with duplicate sets of types whereby an impression may be made from both the top and bottom of each wheel in a manner well known in the art. In the present instance, the upper impression is made upon a suitable check strip, while the lower impression is received upon a recording strip 185. This latter strip passes from a supply-roller up over two guiding pins 187 and the platen 188 and then down to a feeding roller 189. This latter roller is suitably journaled upon the side frame of the machine and is provided with a ratchet wheel 190 and a pinion 191. The roller receives its forward step by step movement through the medium of a spring drawn pawl 192, which is mounted upon a pivoted platen lever 193, carrying the platen 188. Retrograde movement of the feeding roller is prevented by a spring pressed pawl 194, mounted upon the side frame and engaging the ratchet wheel 190.

The platen lever 193 is pivoted to the printer frame at 195 and is normally drawn into the position shown in Fig. 11 by a coil spring 196 which connects a projection of said lever to a portion of said frame. The lever is drawn down against the tension of the spring 196 by a pivoted pawl 197 mounted upon an arm 198 which is fast to the extended trunnion end 56 of the key-coupler. The pawl 197 is normally drawn into the position shown in Fig. 11 by a coil spring 199 which connects its lower end to a lug 200 forming part of the lever 198. When the key-coupler is elevated, the arm 198 is moved downward and thus causes a bevel nose 201, formed on the pawl 197, to engage a lug 202 projecting from the platen lever and draw the latter downward until the lower bevel end 202ª of the pawl 197 strikes a stationary pin 203 to disengage the nose 201 from the lug 202. When this operation takes place, the platen lever 193 snaps upward, which brings the platen 188 in contact with the detail strip to force the latter and the inking ribbon, hereinafter described, against the type wheels. In order to prevent a blurred impression and to cause the necessary rebound of the platen, both the platen lever 193 for the record strip and the platen lever 204 for the check strip, are provided with a nose 205 which contacts with a spring pressed plunger 206 to hold the platens 188 and 207 a slight distance away from the type. This construction is best illustrated in connection with the check platen lever 204, the parts of the lower lever being obscured. As it is not desirable at all times to operate the check platen lever 204, I provide means for throwing this lever into and out of connection with the lever 193. This means comprises a vertical slide 208 supported by the journal pin 195 and formed with an elongated slot 209 so that it may be moved vertically to cause a headed bolt 210, carried thereby, to enter an elongated slot 211 formed in the lever 204. An auxiliary pin 212 is mounted on a slide 208 and projects into a slot 213, formed in the lever 193, to cause the said slide to rock with the lever and impart motion to the upper platen lever through the medium of the bolt 210. The slide 208 is raised to cause the bolt 210 to enter the slot 211 by the special check-key 32 which is fast upon a short shaft 215, and is formed with an elongated slot 216 into which projects a pin 217 mounted on said slide.

As it becomes necessary to latch the key 32 in its depressed position for a predetermined period, I provide the inner end of the shaft 215, which projects through the side frame, with a rigid pawl 218 formed with a shoulder 219, as best shown in Fig. 4. When the key is depressed, the pawl 218 is elevated until the nose 220 of a spring drawn pawl 221 passes under the shoulder 219 and holds said pawl 218 in its elevated position. After the pinion 155 has made a complete revolution, a cam 222 carried thereby, engages the upper end of the pawl 221 and forces the same rearward against the tension of its spring 223 to disengage the nose 220 from the shoulder 219 and allow pawl 218 to assume its normal position, shown in Fig. 4.

The above described means provide for throwing the check platen lever into and out of operative position at will, and it therefore becomes necessary to also provide means for stopping the feed of the check paper and the printing of the date and consecutive number upon the check. This result I accomplish by providing the key 32, with a pendent, curved arm 224 which carries two laterally projecting pins 225 and 226. The pin 226, when the key is depressed, contacts with the incline edge 227 of a pivoted bell crank lever 228 which, as best shown in Fig. 11, is pivoted upon the forward end of a larger bell crank lever 229, which in turn is pivoted upon the printer frame. As the pin 226 rises, it plays along the surface 227 and thus forces the lever 228 rearward against the tension of a coil spring 230 which connects it to the lever 229 and normally holds it in the position shown in Fig. 11, with a shoulder 231 which is formed thereon, contacting with pin 232 on said lever 229.

When the lever 228 is forced rearward, as above described, a pin 233 mounted on the arm 198 is caused to project into an elongated slot 234, formed in said lever 228, and thus couple said lever 228 to the arm 198. When the parts are so coupled, the operation of the key coupler will cause the bell crank lever 229 to be rocked upon its pivot 235, thus elevating its rear end. This rear end of the lever is formed with an elongated slot 236, through which projects a headed pin 237, to connect said lever movably with an upright rack bar 238. This rack-bar is guided by anti-friction rollers 239 and 240 mounted on suitable studs which are secured to the printer frame, so that its rack-teeth will always mesh with a pinion 240ª mounted loose upon a rigid shaft 241 which projects from the printer frame as shown in Figs. 1 and 7. The pinion 240ª is held in its normal position, as shown in Fig. 7, by a coil spring 242 which surrounds the shaft 241 and bears with its opposite ends one against the pinion and the other against the side frame.

One side of the pinion 240ª is provided with a bevel tooth 243, as shown in the detail part of Fig. 7. This tooth normally projects into a notch 244 formed in the sleeve 245 which is journaled on the shaft 241, and carries a suitable electro and two disks 246 which are milled upon their peripheries and act as feeding disks for the check strip. When the rack bar 238 is elevated in the manner above described, the gear 240 is rotated so as to cause the bevel tooth to ride out of the notch 244, the pinion 240ª being forced inward against the tension of its spring to permit of this operation. As the rotation of the wheel 240 continues, the tooth 243 rides against the end of the sleeve 245 until the tooth agains enter the notch. Upon the downward movement of the rack bar, the pinion 240 is rotated in the opposite direction and as the tooth 243 cannot ride out of its notch in this direction, the sleeve 245 is caused to rotate with the pinion and thus feed the check strip and print an advertisement or other matter upon the same from the electro carried by said sleeve.

In order to prevent any possible retrograde movement of the sleeve 245 during the time the pinion 240ª is making its idle movement, I form said sleeve with a notch 247 into which projects a stop-nose 248 formed upon a pawl 249 which is pivoted upon the printer frame and is spring-drawn into engagement with the sleeve by a coil spring 250 which connects it to the frame.

The rack bar 238 is provided with a laterally projecting pin 251, which when the bar has nearly completed its upward movement contacts with the underside of the pawl 249 and lifts the nose of the same out of the notch 247 to free the sleeve 245 and allow the same to be rotated during the downward movement of the rack-bar. After the pin 251 passes free of the pawl 249, the latter is drawn by its spring into engagement with the periphery of the sleeve, and to positively arrest the latter, when the nose 248 again reaches the notch, the sleeve is slightly reduced, as at 252. By this construction, any danger of the nose 248 jumping over the notch 247 is prevented, and said nose caused to positively stop the forward movement of the sleeve 245 after the same has made a complete revolution. The outer end of the said sleeve 245 is provided with a gear-wheel 254 which meshes with a companion gear 255, best shown in Fig. 8, and mounted upon the combined platen and feed roller 256, said roller being suitably journaled upon the printer frame. As the key 32 is automatically released near the end of the operation of the machine and the lever 228 thus thrown out of connection with the lever 198, a possibility arises of the rack 238 not being fully returned to its normal position, and to overcome any such misoperation, I provide the lever 198 with an extension 257 which, as the coupler returns to its normal position, contacts with the upper edge of the rear portion of the lever 229 and forces the same downward. Further, it is very desirable, after an amount-key, has been operated and the key-coupler given its initial movement, that the special key-check 32 be locked against any movement, and to accomplish this result I provide a pivoted latch pawl 258, suitably mounted upon the printer frame so as to normally be supported by the arm 198 in such a position as to hold a hook projection 259, formed thereon, out of the path of the pin 225. After the coupler has started its movement, however, the pawl 258 is dropped to a position in which the hook projection 259 will intercept the pin 225, and thus lock the check key against movement. In addition to operating the feed for the check strip, the rack bar 238 also operates the consecutive numbering device and the platen for the same.

The operation of the consecutive numbering wheels is accomplished by an incline shoulder 260 formed on the rack bar and contracting with an anti-friction roller 261, which is mounted on a lever 262 journaled upon a shaft 263. The upper end of the lever 262 is formed with an elongated slot 264 which receives a pin 265 mounted upon a pawl carrying yoke 266 which is journaled upon a shaft 267 supported by the printer frame. The operating pawl 268 is journaled in this yoke-frame, and is spring-pressed to force it into engagement with the ratchets 269 of the numbering wheels 270 which are loose upon the shaft 267. The construction and operation of the pawl 268 is such as to cause the consecutive number printing wheels to advance one number upon each operation in a manner well known in the art and needing no further description here. Retrograde movement of the printing wheels is prevented by spring-pressed pawls 271 which engage the respective ratchet-wheels.

The consecutive number printing wheels, as best shown in Figs. 10 and 11, are provided with spring-pressed pawls 272 which are adapted to be picked up by the wall of a groove formed in the shaft 267 and thus return all of the wheels to the zero point when the shaft is rotated, which construction is also well known in the art. The rotation of the shaft is accomplished by thumb-nut 274 fast upon the sleeve 275, which has a slot and pin connection with the shaft so that it may slide longitudinally thereon, and cause the shaft to turn therewith when it is rotated. Any rotation of the thumb nut is normally prevented by pin 276, carried thereby and which projects into a suitable aperture formed in the printer frame, being held in this position by a coil spring 277, mounted within the nut so as to normally force the same inward.

The dating wheels 278 are mounted loosely upon the shaft 267 beside the consecutive numbering wheels, and are arranged to be adjusted through the medium of inter-meshing pinions 279 and 280 mounted on their respective wheels and upon the ends of nested sleeves 281 which are mounted upon a shaft 282 and are provided at their outer ends with adjusting thumb-nuts 283 as clearly shown in Fig. 9.

It will be seen from the above that each time the rack 238 is reciprocated, the lever 262 will be rocked upon its fulcrum and will thus rock the yoke-frame carrying the pawl 268 and operate the consecutive number printer one step.

A small stationary electro 284 is mounted just forward of the consecutive number printing wheels, and as the check strip passes over the consecutive number wheels and this electro, it is in position to be forced downward and receive an impression from both of these printing devices. This impression is secured by means of platens 285 and 286 mounted in a single platen bar 287, which is pivoted on the forward end of a lever 288. This lever is pivoted to the printer frame and is normally drawn downward by a coil spring 289, which connects it to said frame. A pivoted pawl 290 is mounted on the lever 288 and is normally spring-drawn by a coil spring 291 into the position shown in Fig. 11, the pin 292 for the spring 289 forming the stop to the pawl. The rack-bar 238 is provided with a lug 293 which, when the bar is elevated, contacts with and elevates the pawl 290 and thus correspondingly raises platen lever 288 against the tension of its spring. As the bar 238 continues its movement, the lug 293 passes free of the pawl 290 and permits the platen lever to spring downward under the stress of the spring 289 and effect the printing. In order to provide for a proper rebound of the platen lever a small pivoted pawl 294 is mounted upon the printer frame and is normally drawn against a stop pin 295 by a coil spring 296, said pawl being provided with a lug 297 which contacts with the lower edge of the lever 288. A notch 298 is formed in the said lower edge of the lever just forward of the lug 297, so that when the lever descends rapidly and strikes the lug 297, the latter will be forced forward into the recess 298 and thus allow the platen to force the check strip against the type. The power of the spring 296, however, is greater than that of the spring 289 when the parts are in normal position, and the platens 285 and 286 will thus be withdrawn to the positions shown in Fig. 11 after they have made an impression by the pawl 294 resuming its normal position.

The check strip 184 passes from a supply roller 299 up and over a stationary guiding strip 300, thence forward between the feed-rollers, thence over a stationary guiding bar 301, forward under the platens 285 and 286 and 207, and finally out of the machine under a saw-edge knife 302, (see Fig. 1) against which the strip is drawn and severed by hand. A table 303, as shown in Fig. 3, is located below the blade 302 to support the printed strip in position to be grasped by the hand and drawn against the sawteeth.

*The cash drawer.*—The cash drawer 304 is mounted in any suitable manner in the lower portion of the frame, and is adapted to be projected from the same when released by a coil spring 305 mounted on the back of the frame in such position as to engage the rear of the drawer when the same is closed. The drawer is latched in its closed position by a bell crank latch lever 306, which is journaled upon a shaft 134 and rests with its rear end upon the shaft 127. The rear end of this latch lever is formed with a pendent nose 308 which engages the shoulder 309 of a pivoted latch pawl 310, mounted in the rear wall of the drawer, and normally forced upward by the coil spring 311. The upward movement of this pawl is limited by an adjustable stop screw 312, also mounted in the rear wall of the drawer. The upper end of the bell crank lever 306 is bifurcated to form two arms 313 and 314 which coöperate with cams 315 and 316. These cams, which are mounted upon the rotation shaft 83, oscillate the bell crank lever 306 to release the cash drawer upon each operation of the machine. Another bell crank lever 306ª is journaled upon the shaft 134 as shown in Fig. 5 and is formed at its rear end similar to lever 306; this rear end being normally held down upon the top of the rear wall of the drawer by a coil spring 307.

After the cash drawer has been released and passed forward, from under the rear end of the bell crank lever 306ª the spring 307 draws the lever down, and moves a hook 317 carried by said lever forward. Upon the downward movement of the key coupler, a bevel lug 318, carried by the same, engages the hook 317, and forces the same forward, and then permits the same to spring back over it to lock the coupler against a second operation until the cash drawer has been again closed. The closing movement of the cash drawer raises the lever 306ª, and thus rocks the latch arm 317 out of the path of the lug 318 and leaves the machine free for operation.

As it is sometimes desirable to operate the machine when the cash drawer is open, I pivot a spring lever 319 upon the shaft 134 and provide the same with a pin 320, which may be caused to enter either of spaced apertures 321 and 322, formed in the frame, whereby the lever is held in either of two adjusted positions. The lower portion of the lever is provided with a laterally projecting lug 323 which, when the lever is drawn forward, acts as a stop for the latch arm 317, to prevent the same passing far enough rearward to engage the lug 318. The alarm, or bell 324, is suitably mounted upon the main frame, and is adapted to be sounded upon each operation of the machine by a bell-clapper 325 mounted upon a lever 326 which is journaled upon the shaft 60. The clapper is pivoted to said lever and is normally held in the position shown in Fig. 16 by coil spring 327 which connects it to said lever, a stop-lug 328 limiting its movement under the stress of the spring.

A cam 329 is mounted upon rotation shaft 83, and is adapted to engage the forward end of lever 326 and elevate the same against the stress of a spring 330 which connects it to the main frame. After elevating the forward end of the lever 326, the cam 329 passes free of the same and permits the lever to rapidly resume its normal position with the result that the rear end of said lever comes violently in contact with transverse shaft 331 which supports the segments 70. When the lever 326 is thus suddenly arrested, the bell clapper 325 continues its movement against the stress of its spring and sounds the bell, but is immediately withdrawn to its normal position shown at Fig. 16.

As shown in Fig. 3, the key-coupler is provided at one end with a vertical extended arm 332, to which is attached one end of a coil spring 333, the opposite end of said spring being secured to the main frame. The office of this spring is to return the key-coupler fully to its normal position after it has been raised and thus incidentally assist the return movement of the operating handle 36. The arm 147 which is fast to the key coupler, is provided with a laterally projecting pin 334, which coöperates with a projecting arm 335 mounted on the yoke frame 138 of the clerk's keys bank, to lock the coupler, after it has made its initial movement, against further movement in the same direction, until one of the clerk's keys is operated to move said arm 335 out of the path of the pin 334.

Having thus described my invention, what I claim is new and desire to secure by Letters Patent, is:—

1. In a cash register, the combination with a series of counter operating racks, of a counter coöperating therewith, cams carried by the racks, indicators and connecting mechanism operated by said cams, and means operating independently of the racks for preventing retrograde movement of the indicators at all times after their initial movements and irrespective of the return of the racks.

2. In a cash register, the combination with a series of operating racks formed with cam extensions, of a counter coöperating with said racks, a series of rotary indicators, means operated by the cam extensions for setting the indicators, and devices operating independently of the cam extensions for preventing retrograde movement of the indicators at all times after their initial movements and irrespective of the return of the cam extensions.

3. In a cash register, the combination with a series of operating racks, of a counter coöperating therewith, a series of rotary indicators, a series of spring-drawn elements for operating said indicators, means connecting the racks and the spring-drawn elements for imparting movement to the latter, means operating independently of the racks for preventing retrograde movement of the indicators at all times after their initial movements and irrespective of the return of the racks.

4. In a cash register the combination with a series of operating racks of a counter coöperating therewith, a series of rotary indicators, spring-drawn operating members for said indicators, means connecting the racks and spring-drawn members for moving the latter according to the movements of the racks and at the same time increasing the tensions of the springs by both the movements of the members and the connecting means.

5. In a cash register the combination with suitable operating mechanism of a series of rotary indicators, arranged to be moved according to the movements of the operating mechanism, spring devices for retarding the movements of the indicators under the influence of the operating devices, and means for increasing the tensions of the springs at a ratio greater than that determined by the movement of the indicators alone.

6. In a cash register, the combination with a differentially movable indicator actuating member, and an indicator, of a differentially movable indicator setting member connected to said indicator and having a one-way connection with said actuating member, a spring connecting oppositely moving parts of said actuating member and said setting member, and a latching device for holding said actuating member in proper set position independently of the continued movement of the indicator setting element.

7. In a cash register the combination with a series of operating cams of a series of indicators, racks for operating said indicators, ratchets for moving said racks, but movable independently of the same, whereby the momentum of the indicator will not affect said ratchets, means connecting said ratchets to the cams whereby the cams may return without the ratchets, and devices for locking the ratchets in their set positions.

8. In a cash register, the combination with an operating cam, means for moving the same different distances, a rotary indicator carrying a pinion, a segmental rack meshing with said pinion, a spring for holding the rack in its normal position, and means connecting the cam to the rack and movable independently of the cam or rack.

9. In a cash register the combination with a series of cams of a series of rotary indicators carrying pinions, a series of operating racks meshing with said pinions, a series of pivoted levers and connections operated by said cams for actuating the racks, and springs connecting said racks and levers.

10. In a cash register the combination with a series of operating cams of a series of indicators, operating racks for said indicators, movable operating devices engaged by said cams and connected to the indicator operating racks, and springs connecting said racks and the movable operating devices.

11. In a cash register the combination with a series of operating devices of a series of indicators, indicator operating mechanism interposed between said devices and indicators and comprising two connected parts movable in opposite directions, and springs connecting said movable parts.

12. In a cash register the combination with a series of operating cams of a series of rotary indicators, means connecting the cams and indicators and comprising two parts movable in opposite directions and springs connecting said movable parts in such manner that their tensions are increased by the movements of each of said parts.

13. In a cash register the combination with a series of operating devices of a series of rotary indicators, operating racks for said indicators, springs connected to the operating devices and the operating racks for holding said racks in normal position, a device operating said racks but free of the same, and means for locking this latter device in its set positions.

14. In a cash register, the combination with a series of operating cams of a series of rotary indicators carrying pinions a series of pivoted rack segments meshing with said pinions, pivoted ratchet segments engaging said rack segments but movable independently of the same, springs for holding the rack segments against the ratchet segments, means connecting the operating devices with the ratchet segments, and devices for locking the ratchet segments in their set positions.

15. In a cash register the combination with a series of operating segments formed with cam extensions of a counter coöperating with said segments, a series of rotary indicators carrying pinions, a series of pivoted rack segments engaging said pinions, a series of pivoted ratchet segments for operating the rack segments but arranged to be moved independently of the same, springs for holding the rack segments in contact with the ratchet segments, means for increasing the tensions of the springs independently of their increase by the movements of the rack segments, devices connecting the cams to the ratchet segments, and means for locking the ratchet segments in their set positions.

16. In a cash register the combination with a common operating means of two independent counters, a series of special key elements having initial movement under manipulative control and a final movement under power control, means operated by all of said key elements for throwing one of said counters out of operative position, and means operated by one of said special key elements for throwing the remaining counter into operative position.

17. In a cash register, the combination with a series of amount key elements having initial and final movements, of a special key element having initial and final movement, an operating member given a movement by the initial movement of said amount elements but prevented from moving farther, means operated by said initial movement of said amount elements for releasing said special element, and means operated by said special element for unlocking the operating member.

18. In a cash register, the combination with a series of amount keys, of a series of special key elements all adapted to have an initial and a final movement, a member common to all of the keys and arranged to be operated upon the initial movement of the amount keys, and a locking device for the special key elements operated to release them upon the movement of the common member by the amount keys.

19. In a cash register, the combination with a series of amount keys, of a series of special keys, an operating handle, a locking device for preventing the operation of the special keys until an amount key has been operated, locking devices for preventing the operation of the operating handle until a special key has been operated, a common operating member and means for locking the operating handle to said common member and unlocking it from the same.

20. In a cash register, the combination with a series of amount key elements arranged to have an initial movement of a series of special keys, a member common to the amount key elements and operated by their initial movements, a lock for the special keys comprising a rock frame having a series of locking fingers which engage the special keys and arranged to be operated by the common member.

21. In a cash register, the combination with an operating mechanism, of a counter mounted in a movable frame; counter operating devices; a pivoted arm mounted on said counter frame; a throwing lever formed with a recess in proximity to said pivoted arm; means connected to said operating mechanism for operating said lever; and manipulative means for positioning said pivoted arm to cause the same to engage either said recess or the solid portion of said throwing lever to control the engagement of a counter with its operating devices.

22. In a cash register, the combination with an operating mechanism, of a counter mounted in a pivoted frame, a pivoted arm mounted on said counter, means connected to the operating mechanism for operating said arm, and devices for locking said arm to the counter frame or unlocking it from the same at will.

23. In a cash register, the combination with an operating mechanism of a pivoted counter frame, a pivoted throwing arm mounted on said frame, a movable device also mounted on said frame for locking the arm against independent movement, and means for operating this movable device at will.

24. In a cash register, the combination with an operating mechanism, of a counter mounted in a pivoted frame, a throwing arm for said frame pivoted thereon, and means for locking the arm to the frame or unlocking it from the same at will, and a key and connections for operating this means.

25. In a cash register, the combination with an operating mechanism, of a counter mounted in a pivoted frame, a pivoted arm mounted on said counter frame and arranged to be locked to or unlocked from the frame at will, and a cam connected to the operating mechanism and engaging said arm.

26. In a cash register, the combination with a series of key levers, of a member common to the same, a cash drawer, a bell crank lever arranged to be held in normal position by resting upon the top of the drawer when the latter is in its closed position and to lock the common member when it is no longer supported by the drawer, and means for supporting the bell crank lever clear of the common member irrespective of the movements of the cash drawer.

27. In a cash register, the combination with a series of counter operating elements, of a counter, a series of indicators, a series of indicator operating elements, means intermediate the counter operating elements and the indicator operating elements movable independently of said elements, and spring devices connected to said intermediate means so that the tension on said means will be increased according to the degree of movement of said means.

28. In a cash register, the combination with a series of operating devices, of a series of indicators, indicator operating mechanism interposed between said devices and the indicators and including spring supports movable away from each other to a degree exceeding the degree of movement imparted to the indicators, and a spring connecting said supports.

29. In a cash register, the combination with a series of key levers of a movable member common to the same, a cash drawer carrying a pivoted latch, a lever normally resting on said latch to hold the drawer closed, a cam for operating said lever, and another lever so constructed that when unsupported by the drawer it engages and locks the common key member.

30. In a cash register, the combination with a series of key levers, of a member common to the same, a cash drawer carrying a pivoted latch, a bell crank lever resting on said latch to lock the drawer in its closed position and another bell crank lever constructed, when unsupported by the latch, to engage and lock the common key member, and a means for holding the second bell crank lever out of engagement with the common key member irrespective of the movements of the cash drawer.

31. In a cash register, the combination with a counter operating rack having a cam arm, of a counter, an indicator, an indicator operating rack, means intermediate the cam arm and said latter rack for setting the indicators, and a spring intermediate the indicator rack and said means.

32. In a cash register, the combination with a movable indicator, an operating rack for the same, an actuating device for said rack movable independently of the same, and a spring so connected to said rack and operating device as to have its tension increased by the movement of either.

33. In a cash register, the combination with a series of key levers arranged in banks of a series of registering frames adapted to be operated thereby, and rock frames one for each bank of key levers and each of the same formed with a hook extension which upon the return of the key levers engages its respective registering frame to return the same to its normal position.

34. In a cash register, the combination with a series of key levers of a registering frame for the same, a rock frame common to all of said key levers, and carrying a hook which is arranged to engage the registering frame to return the same to its normal position, and a coil spring connecting the rock frame to a stationary part of the machine for returning the said rock frame to its normal position.

35. In a cash register, the combination with an operating mechanism, of a series of type carriers operated thereby, two platen levers carrying platens for printing from the opposite sides of said carriers, a slide for coupling the two platen levers together at will, a special key for operating the slide, and a means for preventing the operation of the special key after the regular movement of the operating devices has commenced.

36. In a cash register, the combination with an operating mechanism of a series of type-carriers connected thereto, platens and connections, a special check key, a reciprocating rack adapted to be thrown into coöperative relation with the operating mechanism by the check key and automatically thrown out again at the end of the operation of the machine, check strip feeding rollers, and a clutch mechanism between said rack and feeding rollers whereby the reciprocation of said rack will cause a movement of said rollers in a forward direction only.

37. In a cash register, the combination with an operating mechanism, of a series of type-carriers connected thereto, platen levers carrying platens, which coöperate with said type carriers, means connected to the operating mechanism for operating one of the platen levers, a check key and connections for coupling the two platen levers for movement together, and a means for locking the check key against operation after the movements of the operating mechanism have commenced.

38. In a cash register, the combination with an operating mechanism of a series of type-carriers connected thereto, a special check-key, check-strip feeding devices arranged to be thrown into operation when the check key is operated and to automatically return to inoperative position upon the completion of the machine's movement, a consecutive number printer, a pivoted platen lever carrying a platen for the consecutive number printer, and a means for operating this platen from the check-strip feeding devices.

39. In a cash register, the combination with an operating mechanism, of a series of type-carriers connected thereto, platen levers carrying platens for printing from said type-carriers and connected to the operating mechanism, a special check-key, a consecutive number printer, a check strip feeding device, a platen for the consecutive number printer, means operated by the check-key for throwing the consecutive number printer, the check-strip feeding device, and the consecutive number printer platen into operative condition and means for preventing the operation of the check-key after the movement of the registering mechanism has commenced.

40. In a printer for cash registers, the combination with the printing mechanism, of a strip feeding device comprising a reciprocating rack, a pinion engaged by said rack and carrying a clutch tooth, a feeding roller arranged to be moved by said tooth in one direction only, a pivoted pawl for locking the feeding roller during the negative stroke of the rack, and means carried by the rack for disengaging said pawl from the roller as the negative stroke of the rack is completed.

41. In a cash register, the combination with an operating mechanism, of a series of type carriers connected thereto for printing the amounts of the several transactions, a printing device for printing the consecutive number, independent platens for printing from the respective types, means connecting one of said platens permanently to the operating mechanism, adjusting devices for connecting the remaining platen to the operating mechanism at will, a key for operating said adjusting devices, and means for locking said key against operation after the movement of the operating mechanism has commenced.

42. In a cash register, the combination with a printing mechanism, of a pivoted platen lever formed with a notch, means for operating said platen, and a pivoted spring-drawn arm engaging the platen lever whereby a rapid movement of said lever will cause the arm to temporarily pass into said notch and permit an impression to be made.

43. In a cash register, the combination with an operating mechanism, of type-carriers connected thereto, a strip-feeding device, a rack-bar for operating the same, a bell crank lever for operating said rack-bar, means for connecting the bell crank lever with the operating mechanism at will and automatically disengaged therefrom at the end of each operation of the machine and a device connected to the operating mechanism for positively returning the bell-crank lever to its normal position.

44. A cash register key element having mounted thereon a movable device coöperating with a stationary member, and a member movable with said key element, said movable device being shaped to engage said stationary member to latch said key element in a partially operated position, and also being positioned to be struck by said movable member and moved thereby into position to permit a complete return of said key element to normal position.

45. In a cash register, the combination with a series of amount keys, of a special key element, and a common member to which said keys are arranged to become coupled, said special key element being shaped to permit an initial movement thereof independently of said common member, a stationary member coöperating with said special key element, and a movable device mounted upon the said special key element shaped to engage said stationary member upon the initial movement of said key element to latch the same in initial position, said movable device also being positioned with relation to said coupling member as to be struck thereby upon the subsequent movement of said coupling member and moved into position to permit said special key element to be returned to normal position at the end of the operation of said coupling member.

46. In a cash register the combination with a series of counter operating elements, of a counter coöperating therewith, a series of rotary indicators, a series of operating devices for said indicators, a series of independently movable connecting devices coöperating with the counter operating elements, positive means connecting the indicator operating devices the last mentioned connecting devices and spring means also connecting these devices.

47. In a cash register the combination with a series of counter elements, of a counter coöperating therewith, a series of indicators a series of indicator racks for operating said indicators, pivoted levers engaging the counter operating elements, positive means connecting said pivoted levers and the indicator racks, and springs also connecting said levers and indicator operating racks.

48. In a cash register the combination with a series of counter operating elements, of a counter coöperating therewith a series of indicators, a series of intermediate mechanisms between the counter operating elements and the indicators, said mechanism including parts movable independently of the counter operating elements and the indicators, and springs connecting said parts.

49. In a cash register the combination with suitable operating mechanism, of a series of rotary indicators, means intermediate the operating mechanism and the indicators, and including springs and connections whereby the tensions of the springs are increased by movements of both ends of the same.

50. In a cash register the combination with a series of counter operating elements carrying cams, of a counter coöperating with said elements, a series of indicators, devices intermediate said indicators and cams, and including parts movable with the indicators, and parts movable independent of the indicators, latching devices for securing said latter parts in their adjusted positions and springs connecting the two groups of parts.

51. In a cash register the combination with a series of operating cams, of a series of indicators, a series of operating racks for said indicators, pivoted levers connected to said racks, and engaged by the operating cams, and springs connecting said levers and racks.

52. In a cash register, the combination with an operating key, of a latching pawl pivoted upon said key; means independent of said key and engaged directly by said pawl for turning the same upon its pivotal point; and a spring connecting said pawl to said key for holding the pawl rocked to one side or the other of its dead-center position on its pivot.

53. In a cash register, the combination with an operating key, of a latching pawl pivoted upon the side of said key and formed with an extending tail to coöperate with a stationary abutment; and a key coupler arranged to strike said pawl when the key is operated, and thereby rotate the pawl to bring the said tail into position to strike said abutment upon the return of the key to normal position whereby to rotate the pawl out of latching position.

54. In a cash register the combination with a series of amount key elements having initial and final movements, of a series of special key elements also having initial and final movements, an operating handle, locking means for the special key elements arranged to be operated upon the initial movements of the amount key elements, and locking means for the operating handle arranged to be operated upon the initial movements of the special key elements.

55. In a cash register the combination with a series of amount key elements arranged to have initial and final movements, a series of special key element also having initial and final movements, a member common to all the keys, means for arresting said member after an amount key element has made its initial movement, means operated by the special key elements for moving said arresting device out of the path of the common member, and independent means for giving said special key elements and said amount key elements their final movements.

56. In a cash register the combination with a series of keys, of a member common to the same and to which the keys become attached, an operating handle, and means connecting said handle to the common member whereby the common member is free of the handle when the latter is in normal condition, but becomes coupled to the handle after the latter is moved from normal position.

57. In a cash register the combination with a series of operating racks, of a counter mounted in a pivoted frame, and arranged to engage said racks, a cam for moving the counter frame to bring the counter into engagement with the racks, a movable arm mounted on the counter frame and engaging said cam, and means for locking said arm to the counter frame or unlocking it from the same at will.

58. In a cash register, the combination with a key coupler and means for actuating the same, of a special key lever formed with provisions permitting an initial movement of said lever independently of the key coupler, and having pivoted thereto a spring operated pawl coöperating with a stationary abutment of said register and with said key coupler, said pawl being shaped to engage said stationary abutment upon the initial movement of said special key lever whereby to latch the same in initial position, and said pawl also extending into proximity with said key coupler so as to be rocked thereby upon the subsequent operation of the coupler and moved into position to permit the special key lever to return completely to normal position.

59. In a cash register the combination with a series of key levers arranged in banks, of a series of registering elements corresponding with the respective banks, a series of movable members each of which is common to the keys of its respective bank and is formed with a hook extension which, upon the return of the key levers, engages its respective registering element to return the same to its normal position.

60. In a cash register the combination with a series of key levers arranged in banks, of a series of registering frames adapted to be operated thereby, and a rock frame for each bank of key levers each of said frames being formed with a rigid hook, so located as to coöperate with its respective registering frame to return the same to its normal position.

61. In a cash register the combination with a series of operating key levers, of a member common to the same, a series of type carriers, intermediate means between the keys and carriers, mechanism for printing both a check and a detail strip a check key for controlling the check printing devices, and means operated by the common key member for locking the check key after the movement of said member is commenced.

62. In a cash register the combination with a printing mechanism, of a platen carried by a movable arm formed with a notch, a spring drawn arm engaged by the movable arm so as to move into said notch when struck, but ultimately move out of the same again.

63. In a cash register, the combination with an operating mechanism, of a cash receptacle, a pivoted latching pawl mounted on the receptacle, a latch connected to be actuated by said operating mechanism and coöperating with said pawl, and means for adjusting the latching pawl in a plane to require a desired extent of movement of the latch before its coöperation with the latching pawl is destroyed.

64. In a cash register, the combination with a registering device, of value elements controlling the registration on same, a special key element having initial and final movement, a key for giving said element its initial movement, an operating mechanism for giving the final movement of said element, and a cam device operated by the initial movement of said special element for preventing operation of the registering device by the value elements.

65. In a cash register, the combination with printing type carriers, of an operating mechanism, a platen for taking impressions from said carriers but normally disconnected from said operating mechanism, additional type carriers and a platen for same normally disconnected from said operating mechanism, and a manipulative device serving when operated to connect both said platens to the operating mechanism.

In testimony whereof I affix my signature, in the presence of two witnesses.

THOMAS CARNEY.

Witnesses:
IRA BERKSTRESSER,
W. McCARTHY.